United States Patent [19]

Akimoto et al.

[11] 4,100,424
[45] Jul. 11, 1978

[54] METHOD FOR CONTROLLING A PHOTOGRAPHIC PRINTING EXPOSURE

[75] Inventors: Taizo Akimoto; Takaaki Terashita; Koji Takahashi; Shigeru Watanabe; Eiichi Asai, all of Minami-ashigara, Japan

[73] Assignee: Fuji Photo Film Co., Ltd., Minami-ashigara, Japan

[21] Appl. No.: 715,589

[22] Filed: Aug. 18, 1976

[30] Foreign Application Priority Data

Aug. 19, 1975 [JP] Japan .............................. 50-100454

[51] Int. Cl.² .......................................... G01N 21/30
[52] U.S. Cl. ..................................... 250/559; 356/202
[58] Field of Search ................... 250/214 P, 559, 571, 250/209; 356/201, 202, 205, 206; 355/68, 69, 83, 97

[56] References Cited
U.S. PATENT DOCUMENTS

| | | | |
|---|---|---|---|
| 3,690,765 | 9/1972 | Rickard et al. | 356/202 |
| 3,708,676 | 1/1973 | Huboi et al. | 355/68 |
| 3,790,275 | 2/1974 | Huboi et al. | 250/214 P |
| 4,001,594 | 1/1977 | Akimoto et al. | 250/559 |

*Primary Examiner*—David C. Nelms
*Attorney, Agent, or Firm*—Sughrue, Rothwell, Mion, Zinn and Macpeak

[57] ABSTRACT

A method is disclosed for controlling the exposure during photographic printing. The transmission density of a negative or original is measured to provide an exposure control signal. In an illustrative embodiment of this invention, the original is divided into a central portion, a peripheral portion, an upper portion, a lower portion, a right-hand portion and a left-hand portion. Means are provided for quantizing a difference in average density between the portions in the negative, which is classified into a plurality of categories in accordance with a logic of combining characteristic values of the negative. The method affords an enhancement of accuracy in exposure control and an enhancement of probability of obtaining prints of good quality.

13 Claims, 16 Drawing Figures

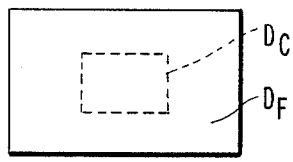
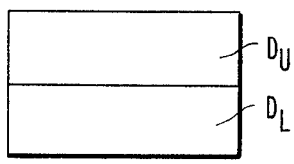
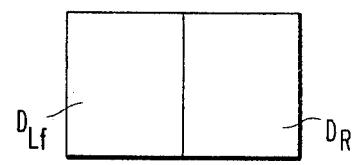
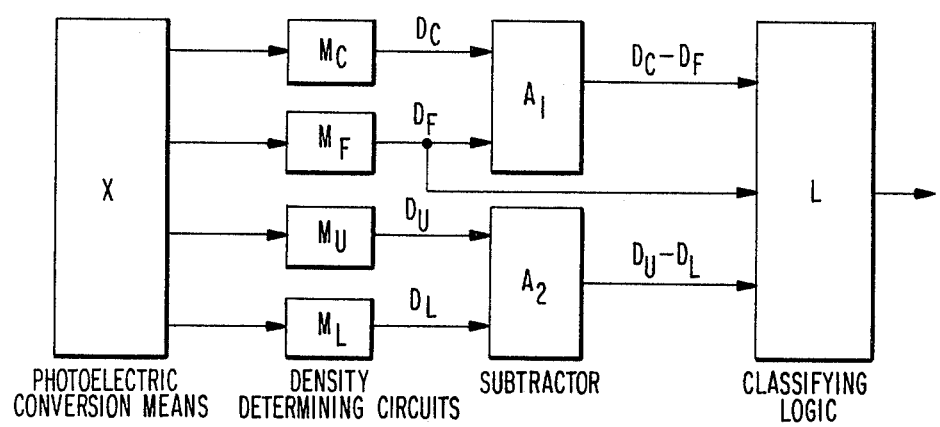
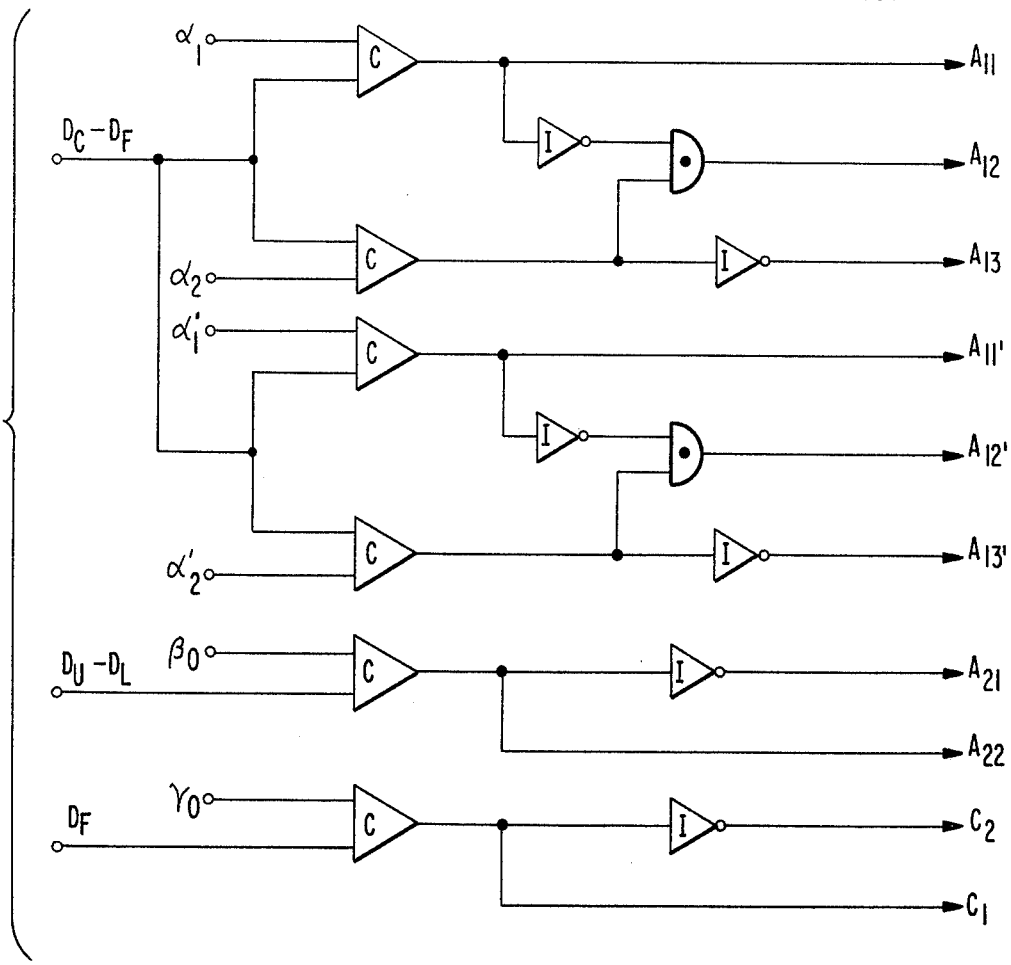

FIG. 7
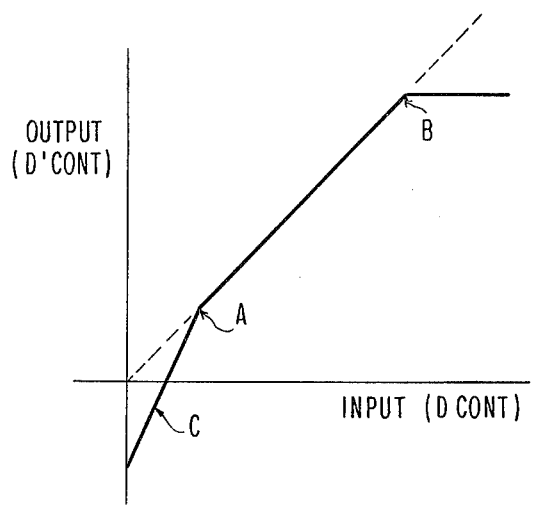
FIG. 8
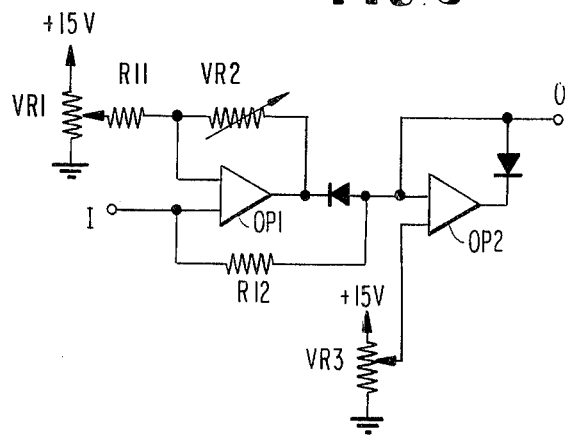
FIG. 9 (A)
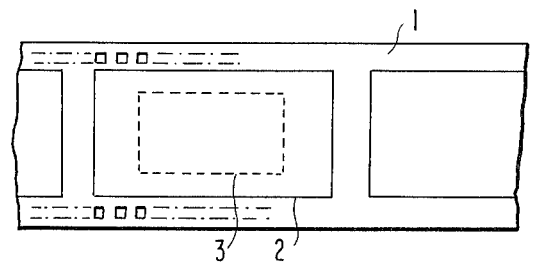
FIG. 9 (B)
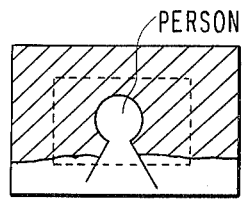
FIG. 9 (C)
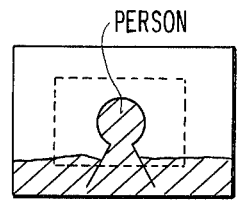
FIG. 10
| $D_C-D_F$ | $A_{21}$ | $A_{22}$ | |
|---|---|---|---|
| | | $C_2$ | $C_1$ |
| $A_{11}$ | 0 | 0 | 1 |
| $A_{12}$ | 1 | 0 | 1 |
| $A_{13}$ | 1 | 1 | 0 |
| | REAR ILLUMINATION | SNOW-SCENERY | HIGH CONTRAST (EXCEPT FOR REAR ILLUMITION) |

METHOD FOR CONTROLLING A PHOTOGRAPHIC PRINTING EXPOSURE

BACKGROUND OF THE INVENTION

1. Field of the Invention

The present invention relates to a method for controlling the exposure amount of duration during photographic printing for purposes of obtaining a photographic print of proper printing density even where the original is a negative film which possesses a subjective density failure. More particularly, the present invention relates to a method for controlling the exposure amount based on the difference in characteristic values (average transmission density, highest density, lowest density, and a combination of these) between portions of the original obtained by dividing the scene of a negative film.

2. Description of the Prior Art

Illustrative examples of prior art exposure control methods are provided in U.S. patent application Ser. No. 588,984, now U.S. Pat. No. 4,001,594 and Japanese Patent Application (OPI) No. 471/1972. The application Ser. No. 588,984 discloses a method for measuring the transmission density of a negative to generate an exposure control signal. The method (as shown in FIG. 9 herein) includes: detecting the highest density and the lowest density of a preselected essential portion 3 of the scene 2 of a 35 mm color negative. The center of the scene is regarded as important for the essential portion because a subject of interest is often recorded in the center of the scene; obtaining a difference therebetween to provide a non-linear conversion; and adding said lowest density signal to said non-linear converted density difference (gradation) signal, wherein exposure controlling is performed on the basis of said added signals. Prior to the Ser. No. 588,984 invention it was typical to base the photographic exposure for printing on the average transmittance (transmission) density LATD (large area transmittance density), which was obtained by scanning the entire frame of the negative. However, satisfactory prints were not obtained in the case where the LATD differed greatly from the average density of the essential portion of the negative. According to the Ser. No. 588,984 invention this problem was partially solved by obtaining the density of the essential portion of the negative. The density is obtained by using a contrast value and the lowest density detected; the contrast value being the difference between the highest density and the lowest density detected from the essential portion of the film. According to this method, reasonably satisfactory prints may be obtained from various negatives such as, for example, negatives with subjective density failure, color negatives with subjective color failure, negatives with extremely high gradation or extremely low gradation, and the like, from which it has not been possible to obtain satisfactory prints by way of a conventional exposure controlling method using only the large area transmittance density. However, since the method merely measures the highest and the lowest densities of the essential portion, two negatives having picture patterns which require wholly opposite exposure corrections, e.g., where one is a picture of a person with rear illumination as indicated in FIG. 9A and the other is a picture of a person with front illumination as indicated in FIG. 9C, are forced to undergo the same exposure correction, so that satisfactory prints cannot often be obtained.

The method disclosed in Japanese Patent Application (OPI) No. 471/1972 provides an arrangement, wherein the characteristic values measured are: (1) the highest density of a subject portion of the negative; (2) the average density of an upper peripheral portion of the negative with the exception of the subject portion; and (3) the average density of a lower peripheral portion with the exception of the subject portion. The latter measurements are combined to classify the negative for correcting the exposure by an amount well suited to the negative. This method also provides reasonably satisfactory prints from negatives, such as, a negative with subjective density failure, a color negative with subjective color failure, and the like, as previously described. According to this method, the negatives are classified into three scene groupings: (1) a rear illumination scene (for example, an adverse-light photography); (2) a front illumination scene (for example, a strobo photography); and (3) a normal scene. Classification is made on the basis of "background function" determined by the average densities of the upper and lower peripheral portions. However, this proposes exposure amount correction conditions with respect to the scene assuming that the sky is bright while the ground is dark, and hence, the picture pattern of the negative must be discriminated in light and shade in up and down directions. Therefore, in the case of negatives whose frame has a greater breadth than length, such as 135 Size (Leica) negative or the like, when a picture is taken with a camera placed in a longitudinal position, there is a possibility that the upper portion may not be discriminated from the lower portion, posing a disadvantage that scenes of the image recorded on the negative cannot be classified.

Furthermore, according to the above mentioned method, a snow scene can be classified into the front illumination scene, so that the wholly opposite correction is applied thereto, which is a fatal disadvantage.

SUMMARY OF THE INVENTION

It is, therefore, an object of the present invention to remove the disadvantages noted above with respect to prior art exposure controlling methods by providing an improved exposure controlling method. This object may be achieved by the provision of a method for measuring transmission density of a negative to generate an exposure control signal, said method comprising: obtaining characteristic values of the negative from an entire scene; dividing the characteristic values into (1) a central portion of an entire scene, (2) an upper portion and a lower portion, and (3) a right-hand portion and a left-hand portion; quantizing (a) a difference between the average density of the central portion in the scene and the average density in the entire scene, and (b) a difference between the average density of the upper portion in the scene and the average density of the lower portion in the scene, in which said characteristic values are combined; classifying the negative into a plurality of categories in accordance with a logic of said combination; imparting a selected one of optimum exposure correction terms thereto, on the basis of which the exposure correction amount is operated; and thereby correcting the exposure control signal.

BRIEF DESCRIPTION OF THE DRAWINGS

FIGS. 1(a), (b) and (c) are plan views, each showing how the scene of the negative is divided.

FIG. 2 is a block diagram of a method and apparatus for classifying negatives for purposes of selecting an exposure control correction amount in accordance with the present invention.

FIG. 2a is a logic diagram of the quantizing portion of the classification logic circuit L of FIG. 2.

FIGS. 4 and 7 are views showing non-linear conversion of gradations.

FIG. 8 is a circuit representation showing one embodiment of the non-linear conversion means.

FIG. 9(A) is a plan view of the negative showing a position of an essential portion set in the scene of the negative.

FIGS. 9(B) and 9(C) show an illustration where the density of a negative having the image of a person recorded thereon changes with different illumination conditions.

FIG. 10 shows a table used for classification of negatives into a plurality of categories.

DETAILED DESCRIPTION OF THE INVENTION

In the present invention a negative is classified into one of several possible exposure correction categories. One of the categories requires no exposure correction. The others require either increases or decreases in the exposure amount. The correction amount, which is determined by the classification, is added to the photographic printing exposure amount obtained by the apparatus and process of U.S. patent application Ser. No. 588,984 (Japanese Patent Application No. 71636/1974).

Classification is achieved by dividing the scene of a negative into blocks or portions, measuring the transmissivity or average density of each block, and combining the measurements in a particular way.

FIGS. 1(a), (b) and (c) show how the scene of a negative is divided into blocks or portions for measurement of the average densities of blocks.

In the following description, the average density of the central portion of the scene is abbreviated as $D_C$, the average density of the entire scene as $D_F$, the average density of the upper portion as $D_U$, the average density of the lower portion as $D_L$, the average density of the right-hand portion as $D_R$, and the average density of the left-hand portion as $D_{Lf}$.

Figure 2B:
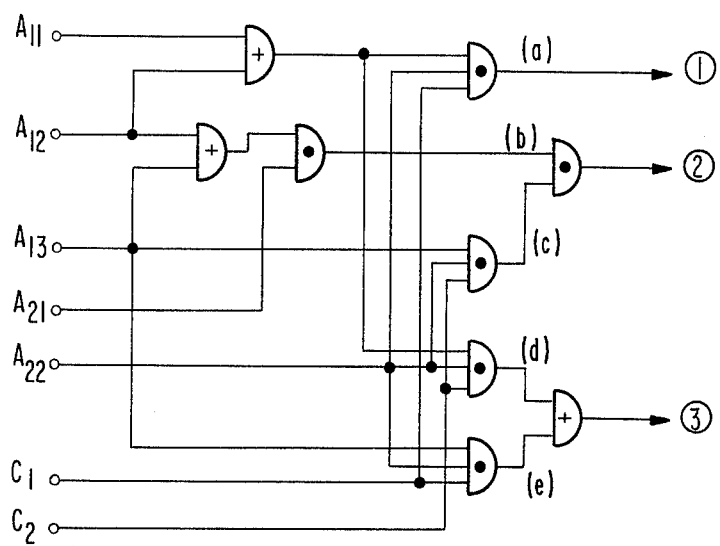
FIG. 2b is a diagram of the logic combining portion of classification logic circuit L of FIG. 2.

FIG. 2 is a block diagram of a system for detecting the average density $D_C$, $D_F$ ... from each scene block of FIG. 1, respectively and classifying the negative accordingly. The apparatus comprises a photoelectric conversion means X for detecting the density of a negative; circuits $M_C$, $M_F$, $M_U$ and $M_L$ for obtaining the average densities $D_C$, $D_F$, $D_U$ and $D_L$ of the respective portions in the scene as previously described; an operation means $A_1$ for calculating $D_C - D_F$; an operation means $A_2$ for calculating $D_U - D_L$, and a discrimination means L for classifying the negative into a plurality of categories in accordance with the outputs of the operation means $A_1$ and $A_2$ and means $M_F$. The photoelectric conversion means X is provided to allow the scene of the negative to undergo two-dimensional scanning to thereby detect the densities of various points on the negative. The means for detecting average density $D_C$, $D_F$, $D_U$, and $D_L$ are provided to select and pick up in time series manner the aforesaid density signals to thereby obtain respective characteristic values. The values of $D_C - D_F$ and $D_U - D_L$ obtained by the operation means $A_1$ and $A_2$ from the thus obtained $D_C$, $D_F$, $D_U$, and $D_L$ are inputted in the discrimination means L. The discrimination means L functions to quantize the outputs of operation means $A_1$ and $A_2$ and an entire scent average density $D_F$ to classify the negative into one of several categories. The quantizing is accomplished as follows.

(i) The value of $D_C - D_F$ is compared with reference values $\alpha_1$ and $\alpha_2$ (here, $\alpha_1 > 0 > \alpha_2$) to thereby quantize it into one of three stages, $A_{11}$, $A_{12}$, and $A_{13}$, as shown below:

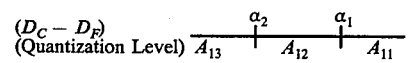

(ii) The value of $D_U - D_L$ is compared with the reference value $\beta_0$ to thereby quantize it into two stages of $A_{21}$ and $A_{22}$ as shown below:

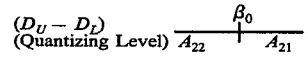

(iii) The value of $D_F$ is compared with the reference value $\gamma_0$ to thereby quantize it into two stages of $C_1$ and $C_2$ as shown below:

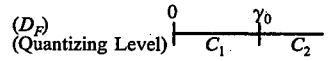

(iv) The value of $D_C - D_F$ is also quantized into three stages on the basis of reference values which differ from $\alpha_1$ and $\alpha_2$. The three stages of $A_{11}'$, $A_{12}'$ and $A_{13}'$ are as shown below:

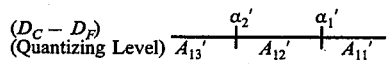

The logic for carrying out the quantizing is apparent from the above description. However, an example is shown in FIG. 2(A) wherein the elements shown are, comparators C, Invert gates I, and AND gates.

The reference values $\alpha_1$, $\alpha_2$, $\beta_0$ ... are determined by testing a plurality of negatives as follows: measuring the difference density ($D_C - D_F$) from a plurality of negatives, confirming the manner of artificial illumination employed to obtain the negative, and plotting density difference of the negative of strong front illumination and strong contrast as is obtained by a strobo photographing, using a certain mark on the density axis. Further, the density differences of the negatives of a strong rear illumination, such as an adverse light, are plotted using another kind of mark in the same way. The density differences other than the above negatives are plotted in the same way. It is found that the plots thus obtained are classified into three groups. Assuming the boundary points between the groups to be $\alpha_1$ and $\alpha_2$ ($\alpha_2 < 0 < \alpha_1$), the reference values $\alpha_1$ and $\alpha_2$ are determined. Other reference values $\beta_0, \gamma_0 \ldots$ are also obtained in the same way.

After quantizing each density difference of the negative, the quantized densities, i.e., $A_{11}, A_{12}$, etc., are logically combined according to a predetermined pattern to determine the proper classification of the negative. In the description that follows the standard logic symbols $\cup$ and $\cap$ are used to designate OR and AND functions.

FIG. 10 is a table showing the logic combinations of the quantized characteristic values (i.e., densities) used for classification. As can be seen from Table 10, the negative which satisfies the logic pattern $(A_{12} \cup A_{13}) \cap A_{21}$ is one which was recorded under rear illumination. FIG. 9 (B) shows the negative of an image of a person recorded outdoors under rear illumination. In the scene, the background, especially the sky, is bright and the person is not illuminated from the front side. The striped part of the negative shows that optical density of the negative is high and the non-striped part shows that the optical density is low. The value $(D_C - D_F)$ will be negative and will have a large absolute value. Consequently, one of the quantizing levels $A_{13}, A_{12}$ will be obtained, as indicated by a "1" in FIG. 10. The characteristic value quantized for $(D_U - D_L)$ will be $A_{21}$. Thus, the combination of the characteristic values is shown in $(A_{12} \cup A_{13}) \cap A_{21}$ and is consistent with a pattern of "rear illumination" of FIG. 10. It is easily understood that several kinds of the negatives, such as ones obtained under conditions of bright scenery (e.g. snow scenes) or high contrast (strobo-photography or front lighting) can also be identified by the logic patterns shown in FIG. 10.

Figure 4:
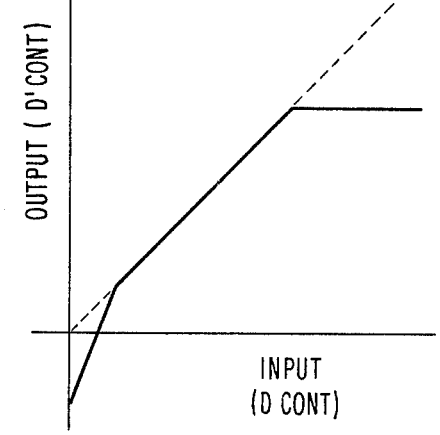
Figure 3:
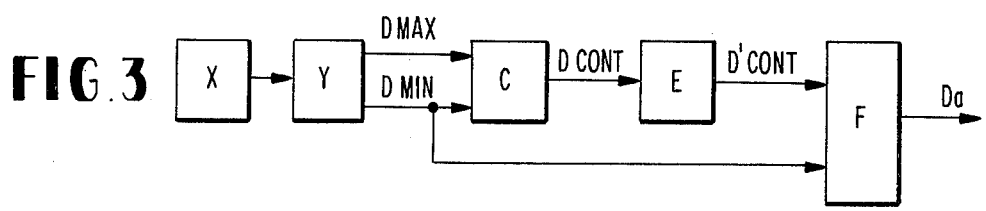
FIG. 3 is a block diagram of a method and apparatus, taken from U.S. patent application Ser. No. 588,984 (Japanese Patent Application No. 71636/1974), for obtaining the fundamental exposure amount to which the exposure correction of the present invention is added.

FIG. 3 is a block diagram showing an exposure control system used with the present invention and disclosed in U.S. patent application Ser. No. 588,984 (Japanese Patent Application No. 71636/1974). The system comprises a photoelectric conversion means X, a means Y for discriminating the highest and lowest densities, a means C for discriminating gradations, a means E for allowing gradation signals to undergo non-linear conversion as illustrated in FIG. 4 and explained in the prior application, and a means for addition F to obtain an exposure amount control signal $Da$ as given below:

$$Da = K_1 Dmin + K_2 D' cont$$

(where, $Dmin$ is the lowest density of an essential portion of the negative; $D'$ cont is the gradation of the essential portion of the negative already non-linearly converted; and $K_1$, and $K_2$ are constants. The values of constants $K_1$ and $K_2$ are the values determined by the calculator simulation of correction of a plurality of frames, preferably $K_1 = 1$ and $K_2 = \frac{1}{2}$.)

In accordance with a first embodiment of the present invention, a correction factor Q is calculated based on the characteristic value differences and is added to the control amount $Da$ determined in the prior system. The correction factor is:

$$Q_1 = K_3(D_C - D_F) + K_4(D_U - D_L) + K_5 |D_R - D_{Lf}|;$$

where $K_3$, $K_4$ and $K_5$ are density difference coefficients whose values depend upon the category of the negative and are determined by the calculator simulation so that the printing exposure amount obtained by the above formula will almost equal the exposure amount artificially determined for the plurality of negatives.

Representative examples of the coefficients for the various categories of negatives, as determined by FIGS. 2 and 10, are given below.

(1) Those negatives satisfying the following logic equation:

$$(A_{11} \cup A_{12}) \cap A_{22} \cap C_1 \quad (2)$$

are categorized as those requiring a plus exposure correction (negatives obtained under conditions of high contrast or oblique light). For negatives in this category the coefficients for the correction factor are:

$$K_3 = \tfrac{1}{2}, K_4 = -\tfrac{1}{2}$$

(2) Those negatives satisfying either of the following logic equations:

$$(A_{12} \cup A_{13}) \cap A_{21} \quad (b)$$

$$A_{13} \cap A_{22} \cap C_2 \quad (c)$$

are categorized as those requiring a minus correction (obtained in a condition of adverse light). The coefficients are:

For group (b) above: $K_3 = \tfrac{1}{2}, K_4 = \tfrac{1}{2}$
For group (c) above: $K_3 = \tfrac{1}{2}, K_4 = \tfrac{1}{2}$ (3) Those negatives satisfying either of the following logic equations:

$$(A_{11} \cup A_{12}) \cap A_{22} \cap C_2 \quad (d)$$

$$A_{13} \cap A_{22} \cap C_1 \quad (e)$$

are categorized as standard and do not require any correction. For the (d) and (e) groups the $K_3 = \tfrac{1}{2}$ and $K_4 = 0$.

A simple logic circuit for implementing the logic explained above is shown in FIG. 2B where conventional symbols (+) and (·) are used to designate OR and AND gates, respectively. Also the lower case letters (a)-(e) correspond to the logic combinations mentioned above, and the numbers 1, 2 and 3 correspond to the categories of negatives.

The coefficient $K_5$ is determined independently of the above groupings and is dependent on $D_C - D_F$ only as follows:

(i) Where the $D_C - D_F$ is quantized into $A_{11}'$, $K_5 = \tfrac{1}{2}$ (ii) Where the $D_C - D_F$ is quantized into $A_{12}'$, $K_5 = 0$ (iii) Where the $D_C - D_F$ is quantized into $A_{13}'$, $K_5 = -\tfrac{1}{2}$ It should, however, be noted in practice that assuming that constants $K_1$ and $K_2$ are constant, the constants $K_3$ to $K_5$ may relatively be determined within the range of from $\tfrac{1}{2}$ times to 3/2 times with respect to the values of the constants $K_3$ to $K_5$. The coefficients in the correction term $Q_1$ may be determined as previoulsy mentioned with respect to the respective negatives belonging to the plus category, those belonging to the minus category, and those belonging to the standard category, on the basis of which the exposure amount correction operated by the correction term $Q_1$ may be conducted to thereby enlarge the range of negatives from which satisfactory prints can be obtained.

Figure 5:
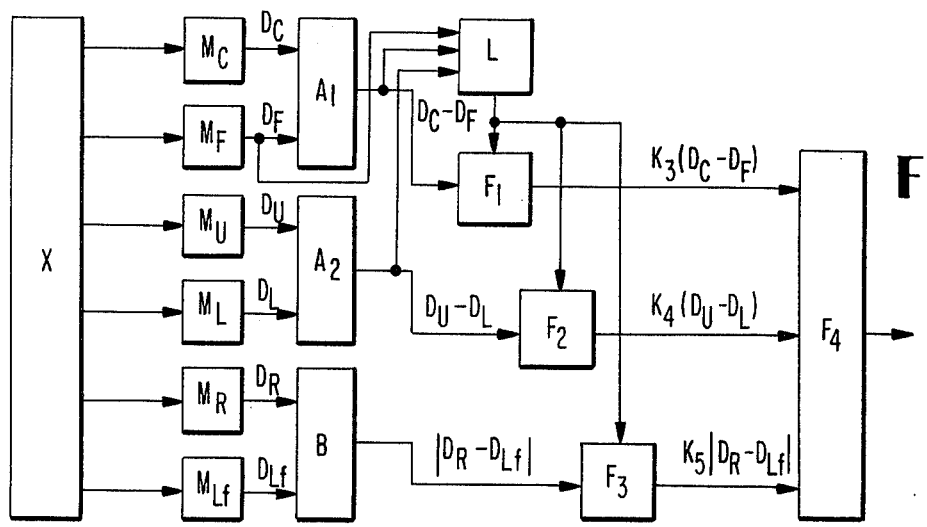
FIGS. 5 and 6 are block diagrams of methods and apparatus for determining the exposure correction amount in accordance with the present invention.

FIG. 5 is a block diagram of the exposure amount control apparatus embodying the present invention, where the blocks X, $M_C$, $M_F$, $M_M$, $M_L$, $A_1$, $A_2$, and L are the same means as those shown in FIG. 2. $M_R$ and $M_{Lf}$ are means for obtaining the $D_R$ and $D_{Lf}$ as previously discussed, B is the operation means for $|D_R - D_{Lf}|$, and $F_1$, $F_2$, $F_3$ and $F_4$ are adding means. In one mode of the instant embodiment, the coefficients $K_3$, $K_4$, and $K_5$ determined by the discrimination logic (means) L based on the $D_C - D_F$, $D_U - D_L$ and $D_F$ lead to the correction term $Q_1$, which may be added to the exposure amount control signal $Da$ (shown in FIG. 3) to thereby obtain a final exposure amount control signal. Since the $K_3$-$K_5$ values are known in advance for the different classifications, the circuits $F_1$-$F_3$ can be simple multipliers with input selection based upon the classification output from classification circuit L. Since, in the specific example described above $K_3 = \frac{1}{2}$ for all catigoris, $F_1$ need only be a simple multiplier which multipliers $D_C - D_F$ by $\frac{1}{2}$. $F_2$ includes input gates for selecting a multiplier from inputs $K_4 = -\frac{1}{2}$, $K_4 = \frac{1}{2}$, and $K_4 = 0$, in dependence upon logic L providing outputs 1, 2, and 3 respectively. $F_3$ includes input gates for selecting between $K_5 = \frac{1}{2}$, $K_5 = 0$, and $K_5 = -\frac{1}{2}$ based on the quantizing outputs $A_{11}'$, $A_{12}'$ and $A_{13}'$, respectively.

Figure 6:
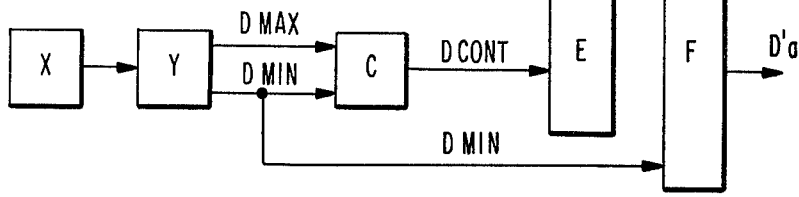

FIG. 6 is a block diagram of an exposure amount control apparatus showing a second embodiment according to the present invention, where X, Y, C, E, F and L are the same means as those shown in FIGS. 2 and 3. The circuit L has the same inputs as in FIG. 2 but for the sake of brevity, the elements and connections of FIG. 2, except for L, are not repeated in FIG. 6.

According to this embodiment, in bringing the gradation signal Dcont discriminated by the gradation discriminating means C into non-linear conversion by means of the non-linear conversion means E, the content of the non-linear conversion is varied by the output of the discrimination logic L to provide the non-linear conversion suited for the picture pattern of the negative, and the output D'cont and Dmin are added by the adding means F to obtain a final exposure amount control signal $Da'$.

According to this embodiment the non linear conversion means E is controlled so as to vary the input/output characteristic shown in FIG. 7. The characteristic as shown is for negatives in the third group, i.e., requiring no correction. FIG. 8 shows an embodiment of the conversion means E which is explained in the aforementioned U.S. patent application. The resistors $VR_1$, $VR_2$, and $VR_3$ are varied in accordance with the output of circuit L. Referring to FIG. 7, a variation of $VR_1$ varies point A on the graph along the dotted line; a variation of $VR_3$ varies point B on the graph along the dotted line; a variation of $VR_2$ varies the angle of line C in the graph.

To better understand the effects of the present invention, an embodiment of the photographic printing according to the present invention will be give below.

Using the embodiment shown in FIG. 5, photographic printing has been carried out with various equations and parameters assumed as shown below, and the results have been compared with apparatus and methods of the prior art.

(1) The fundamental formula for controlling the exposure amount was:

$$Da_1 = Dmin + \tfrac{1}{2}(Dmax - Dmin)$$

The latter is in accordance with one example of the method proposed in the aforementioned U.S. patent application.

(2) The correction term used was:

$$Q_1 = K_3(D_C - D_F) + K_4(D_U - D_L) + K_5|D_R - D_{Lf}|$$

(3) The reference values for quantization of $D_C - D_F$, $D_U - D_L$, and $D_F$ were as follows:
 $a_1 = 0.5V$, $a_2 = -0.5V$
 $\beta_0 = 0V$, $\gamma_0 = 1V$
 $a_1' = 1.0V$, $a_2' = -1.0V$ (4) Objective negatives: 120 frames which possess subjective density failure For comparison with the prior art, the equations and parameters used for the prior art method were those given in the fundamental formula (1) above. The results are given in a table below:

|  | Number of Satisfactory Prints | Ratio |
|---|---|---|
| In case of the invention | 91 | 75.8% |
| In case of prior art | 69 | 57.5% |

In the prior art, a little less than about $\frac{1}{2}$ of the negatives possessing subjective density failure were insufficiently corrected, whereas, with the present invention, the amount insufficiently corrected was about $\frac{1}{4}$ of the total, and corrected prints were obtained from about $\frac{3}{4}$ of the negatives which possess subjective density failure. This demonstrates a remarkable improvement.

As described above, the present invention provides a method for measuring a transmission density of a negative to generate an exposure amount control signal, the method comprising: obtaining characteristic values of the negative from a range of the entire scene of the negative and the scene of the negative divided into (1) a central portion and a peripheral portion, (2) an upper portion and a lower portion, and (3) a right-hand portion and a left-hand portion; quantizing (a) a difference between the average density of the central portion in the scene and the average density in the entire scene, and (b) a difference between the average density of the upper portion in the scene and the average density of the lower portion in the scene, in which said characteristic values are combined; classifying, in accordance with the combination logic, the negative into three categories, one subjected to plus correction, one subjected to minus correction, and one not particularly to require correction; and imparting an optimum exposure amount correction term to the negatives in said categories. Thereby, the present invention provides a further improvement of the exposure control method previously proposed by the present applicant in U.S. patent application Ser. No. 588,984, and provides a great effect that may enhance the accuracy of exposure control, particularly, exposure control with respect to negatives with subjective density failure, and that may enhance the probability of obtaining prints of good quality.

While the invention has been described in detail and with reference to specific embodiments thereof, it will be apparent to one skilled in the art that various changes and modifications can be made therein without departing from the spirit and scope thereof.

What is claimed is:

1. A method for categorizing film negatives for correcting the exposure amount required to make photographic prints from said negatives, said method comprising:

detecting the transmission density of the entire scene of a negative, a central portion of said negative, a first half portion and a second opposite half portion of said negative;

determining the difference values between said densities of said central portion and entire scene to obtain a first difference value and the difference values between said first and second half portions to obtain a second difference value;

quantizing said first and second difference values and said density of the entire scene into discrete quantized values; and logically combining said quantized values into exclusive groups corresponding to categories, the particular combination existing for any given negative determining the group and the category of the negative for correction.

2. The method of claim 1, wherein the quantized values are grouped into three groups representing, respectively, plus exposure correction, a minus exposure correction, and a standard negative.

3. The method of claim 1, wherein the step of quantizing comprises:

comparing said first difference value with predetermined constants $\alpha_1$ and $\alpha_2$, where $$\alpha_1 > 0 > \alpha_2,$$

and selecting one of a series of quantization values $A_{13}$, $A_{12}$, and $A_{11}$ when said first difference value is less than $\alpha_2$, between $\alpha_2$ and $\alpha_1$, and greater than $\alpha_1$, respectively.

4. The method of claim 3, wherein the step of quantizing further comprises:

comparing said second difference value with a predetermined reference value $\beta_0$, and selecting one of the quantization values $A_{22}$ and $A_{21}$ when said second difference value is less than $\beta_0$ and greater than $\beta_0$, respectively.

5. The method of claim 4, wherein the step of quantizing further comprises:

comparing the value of the density of said entire scene with a predetermined reference value $\gamma_0$, where $\gamma_0 > 0$, and selecting one of the quantization values $C_1$ and $C_2$ when said density value is less than $\gamma_0$ and when said density value is greater than $\gamma_0$, respectively.

6. The method of claim 4, wherein the step of logically combining comprises:

(a) combining said quantization values into a first logic category representing negatives requiring a plus exposure amount correction, said category being defined by the combination:

$(A_{11} \cup A_{12}) \cap A_{22} \cap C_1$, (b) combining said quantization values into a second logic category representing negatives requiring a minus exposure amount correction, said category being defined by the combinations:

$(A_{12} \cup A_{13}) \cap A_{21}$, and $A_{13} \cap A_{22} \cap C_2$; and (c) combining said quantization values into a third logic category representing negatives which are standard, said category being defined by the combinations:

$(A_{11} \cup A_{12}) \cap A_{22} \cap C_2$, and $A_{13} \cap A_{22} \cap C_1$.

7. The method of claim 6, wherein said first and second half portions are said upper and lower halves.

8. A method for determining a correction amount $Q_1$ to be added to an exposure amount for obtaining photographic prints from film negatives, said method comprising:

(a) categorizing said film negatives for correcting the exposure amount required to make photographic prints, said categorizing comprising:

detecting the transmission density of the entire scene of a negative, a central portion of said negative, a first half portion and a second opposite half portion of said negative;

determining the difference values between said densities of said central portion and entire scene to obtain a first difference value and the difference values between said first and second half portions to obtain a second difference value;

quantizing said first and second difference values and said density of the entire scene into discrete quantized values; and logically combining said quantized values into exclusive groups corresponding to said categories, the particular combination existing for any given negative determining the group and the category of the negative for correction;

(b) additionally detecting the transmission densities of a third half portion and a fourth half portion of said negative, the division of said first and second half portions being perpendicular to the division of said third and fourth half portions, and subtracting said third and fourth half portion densities to obtain a third difference value, and (c) multiplying each of said first two difference values by a respective coefficient $K_3$ and $K_4$, multiplying the absolute value of said third difference value by a coefficient $K_5$, all said coefficients being selected in dependence upon said categories obtained during the logical combining step, and adding the three products of multiplication to obtain $Q_1$.

9. The method of claim 8, wherein the step of quantizing comprises:

comparing said first difference value with predetermined constants $\alpha_1$ and $\alpha_2$, where $$\alpha_1 > 0 > \alpha_2,$$

and selecting one of a series of quantization values $A_{13}$, $A_{12}$, and $A_{11}$ when said difference value is less than $\alpha_2$, between $\alpha_2$ and $\alpha_1$, and greater than $\alpha_1$, respectively.

10. The method of claim 9, wherein the step of quantizing further comprises:

comparing said second difference value with a predetermined reference value $\beta_0$, and selecting one of the quantization values $A_{22}$ and $A_{21}$ when said second difference value is less than and greater than $\beta_0$, respectively.

11. The method of claim 10, wherein the step of quantizing further comprises:

comparing the value of the density of said entire scene with a predetermined reference value $\gamma_0$, where $\gamma_0 > 0$, and selecting one of the quantization values $C_1$ and $C_2$ when said density value is less than $\gamma_0$ and when said density value is greater than $\gamma_0$, respectively.

12. The method of claim 11, wherein the step of logically combining comprises:

(a) combining said quantization values into a first logic category representing negatives requiring a plus exposure amount correction, said category being defined by the combination:

$(A_{11} \cup A_{12}) \cap A_{22} \cap C_1$, (b) combining said quantization values into a second logic category representing negatives requiring a minus exposure amount correction, said category being defined by the combinations:

$(A_{12} \cup A_{13}) \cap A_{21}$, and $A_{13} \cap A_{22} \cap C_2$; and (c) combining said quantization values into a third logic category representing negatives which are standard, said category being defined by the combinations:

$(A_{11} \cup A_{12}) \cap A_{22} \cap C_2$, and $A_{13} \cap A_{22} \cap C_1$.

13. The method of claim 12, wherein said first and second half portions are said upper and lower halves.

* * * * *